United States Patent [19]

Varaprasad et al.

[11] Patent Number: 5,089,188
[45] Date of Patent: * Feb. 18, 1992

[54] SPINNING OF SOL GEL SILICEOUS-CONTAINING FIBERS WITH WET COAGULATION

[75] Inventors: Desaraju V. Varaprasad, Holland, Mich.; Agaram S. Abhiraman, Stone Mountain, Ga.; Ernest L. Lawton, Allison Park, Pa.

[73] Assignee: PPG Industries, Inc., Pittsburgh, Pa.

[*] Notice: The portion of the term of this patent subsequent to Sep. 17, 2008 has been disclaimed.

[21] Appl. No.: 370,205

[22] Filed: Jun. 22, 1989

Related U.S. Application Data

[63] Continuation-in-part of Ser. No. 293,402, Jan. 4, 1989, abandoned.

[51] Int. Cl.$^5$ ............................................. D01F 9/08
[52] U.S. Cl. ................................... 264/41; 264/183; 264/184; 264/203; 264/210.6; 264/210.8; 264/211; 264/211.15; 264/211.16; 264/233
[58] Field of Search .................. 264/211.11, 184, 211, 264/29.2, 56, 203, 210.6, 210.8, 211.16, 211.15, 211.19, 233, 183; 501/95

[56] References Cited

U.S. PATENT DOCUMENTS

| | | | |
|---|---|---|---|
| 3,597,265 | 8/1971 | Mecklenborg et al. | 117/126 GR |
| 3,821,070 | 6/1974 | Mansmann et al. | 161/172 |
| 3,846,527 | 11/1974 | Winter et al. | 264/63 |
| 3,907,954 | 9/1975 | Mansmann et al. | 264/63 |
| 4,010,233 | 3/1977 | Winter et al. | 264/63 |
| 4,104,045 | 8/1978 | Mansmann | 65/2 |
| 4,125,406 | 11/1978 | Sowman | 106/57 |
| 4,396,587 | 8/1983 | Yamaguchi et al. | 423/40 G |
| 4,397,666 | 8/1983 | Mishima et al. | 65/18.3 |
| 4,471,019 | 9/1984 | Wegerboff et al. | 428/234 |
| 4,919,871 | 4/1990 | Lin | 264/82 |

FOREIGN PATENT DOCUMENTS

| | | |
|---|---|---|
| 0199328 | 10/1986 | European Pat. Off. |
| 62-297235 | 12/1987 | Japan |
| 62-297236 | 12/1987 | Japan |
| 62-297237 | 12/1987 | Japan |
| 62-297244 | 12/1987 | Japan |

OTHER PUBLICATIONS

"Sol-Gel Processing Routes to Oxide Ceramics Using Colloidal Dispersions of Hydrous Oxides and Alkoxide Intermediates" by D. L. Segal, Journal of Non-Crystalline Solids, vol. 63, 1984, pp. 183-191, North-Holland, Amsterdam, Elsevier Science Pub. B.V.

(List continued on next page.)

Primary Examiner—Hubert C. Lorin
Attorney, Agent, or Firm—Kenneth J. Stachel

[57] ABSTRACT

A wet and dry jet wet spinning process produce one or a plurality of siliceous-containing fibers. At least a partial hydrolyzate is formed from silicon alkoxides and/or colloidal dispersions of hydrolyzable metal oxides through acid catalyzed hydrolysis in the presence of a solvent. The ratio of amounts of the water to silicon alkoxide or hydrous oxide is around 1.5 to 1 up to less than around 4 to 1. Both the hydrolysis and polymerization reactions produce an ungelled hydrolyzate with a viscosity in the range of 70 to greater than 1000 poise. This hydrolyzate is extruded through a spinnerette into a gaseous environment for dry jet wet spinning followed by contacting with a nonsolvent liquid or directly into a nonsolvent liquid for wet spinning. The contacting with the nonsolvent liquid is for effective coagulation to produce cohesive fiber that may have some stickiness. The fiber is removed from the nonsolvent liquid where the fiber's length is continuous from the spinnerette to removal. The continuous fiber is collected when it has at least a coagulated surface to produce a predominantly nonsticky fiber. The fiber may be utilized as precursor fiber or further processed by washing and/or stretching and/or drying and/or heating for removal of water, and organic solvent and/or consolidating of the fiber.

40 Claims, 2 Drawing Sheets

OTHER PUBLICATIONS

"Glasses and Glass-Ceramics From Gels" from the Institute of Chemical Research, Kyoto University, Uji, Kyoto-Fu 611, Japan.

"The Sol-Gel Transition in the Hydrolysis of Metal Alkoxides in Relation to the Formation of Glass Fibers and Films" by S. Sakka and K. Kamiya, Journal of Non-Crystalline Solids, vol. 48, 1982, pp. 31-46, North-Holland Publishing Company, 1982.

"Gel Method for Making Glass" by S. Sakka, Treatice on Material Science and Technology, vol. 22, pp. 129-167, Academic Press, Inc. 1982.

"Preparation of Polysiloxanes from Silicic Acid VIII—A Polysiloxane With Good Spinnability" by Y. Abe, N. Shintani, T. Magome and T. Misono, Journal of Polymer Science, Polymer Letters Edition, vol. 23, pp. 497-501, 1985, John Wiley & Sons, Inc.

"Low Temperature Preparation of Oxide Glasses and Ceramics From Metal Alkoxide Solutions", Bulletin of Institute for Chemical Research, Kyoto University, vol. 61, No. 5-6, pp. 381-385, Nov. 1983.

"Glassy Thin Films and Fiberization by the Gel Route", Shyama P. Mukherjee, Rataseasi Ser, Series E, vol. 92 (Glass), 1985, Jean Phalippou, pp. 244-249.

"Fiberizable $Si(OC_2H_5)_4$-$H_2O$-$C_2H_5OH$ Sols With Stabilized Viscosity", W. C. LaCourse, S. Dahar and M. Ahktar, American Ceramic Society, Oct. 1984, pp. 200-201.

"Factors Controlling the Sol-Gel Conversion in TEOS", W. C. LaCourse, S. Dahar, M. Ahktar, R. D. Sands and J. Steinmetz, Journal of the Canadian Ceramic Society, vol. 51, 1982, pp. 18-23.

"Synthesis of $SiO_2$ Glass Fibers From $Si(OC_2H_5)_4$-$H_2O$-$C_2H_5OH$-HCl Solutions Through Sol-Gel Method", Kanichi Kamiya and T. Yoko, Journal of Material Science, vol. 21, 1986, 842.

"Emery Surfactants", Emery Industries, Inc., pp. 52-55.

U.S. Ser. No. 07/293,405 filed Jan. 4, 1989 entitled Gel Promoters for Silica Sols.

U.S. Ser. No. 07/293,406 filed Jan. 4, 1989 entitled Apparatus for Forming Fibers From Sol Gel Compositions.

SPINNING OF SOL GEL SILICEOUS-CONTAINING FIBERS WITH WET COAGULATION

This application is a continuation-in-part of application Ser. No. 07/293,402, filed Jan. 4, 1989, now abandoned.

The present invention is directed to a process for wet and/or dry jet wet spinning of essentially inorganic sol gel fibers and the fibers produced by the process.

The sol gel process is reported to be as old as the first hydrolytic polycondensation of tetraalkoxysilanes in the year 1846 with more recent and increasing interest within the last two decades. Generally, the sol gel process involves the hydrolysis of hydrolyzable silicon-containing compounds at fairly low temperatures with subsequent condensation or densification or consolidation to polysiloxanes, glassy materials or quartz at elevated temperatures. Numerous starting materials exist for the sol gel reaction and include metal alkoxides like tetraalkoxysilanes (tetraalkyl orthosilicate) or other network formers, silicon alkoxides, silicic acid and silicon tetraacetate. The sol gel process presents the tantalizing reward of producing glass at a lower elevated temperature, rather than the more energy intensive conventional melting processes. Within the last few years researchers have suggested the possibility of forming glassy fibers of high purity and homogeneity or of specific heterogeneity through the sol gel process. The article entitled "The Sol-Gel Transition in the Hydrolysis of Metal Alkoxides in Relation to the Formation of Glass Fibers and Films", by S. Sakka and K. Kamiya, *Journal of Non-Crystalline Solids* 48(1982)-31-46, North Holland Publishing company, teaches controlling factors of the ratios of the reactants in an acid catalyzed hydrolysis of tetraethyl orthosilicate and the production of fibers. The spinability of the alkoxide solutions were checked by immersing a glass rod into the solution and pulling it up to draw fiber from the solution. In a recent Japanese patent document publication Kokai No.: 62[1987]-297,237, the addition of silane to a spinning liquor to retard polymerization is taught, and FIG. 1 shows the dry spinning from the ungelled polymerized solution.

It is an object of the present invention to provide a process for producing precursor essentially inorganic, amorphous, siliceous-containing fibers with a reduced tendency for flooding, spreading on the spinnerette face or sticking together of the fibers, and with a capability of producing fine fibers.

SUMMARY OF THE INVENTION

The present invention includes the method of producing sol gel siliceous-containing fibers and those fibers. The method involves forming at least a partial hydrolyzate of silicon alkoxides and/or colloidal dispersion of hydrous siliceous oxides, passing the hydrolyzate through a spinnerette to produce at least one fiber, contacting the fiber or fibers having continuous lengths from the spinnerette with a nonsolvent liquid for effective coagulation to produce cohesive fiber, and removing from the nonsolvent liquid at least one fiber with a continuous length from the spinnerette. The at least partial hydrolyzate is formed from the catalytic acid hydrolysis in the presence of an organic solvent where the ratio of water to silicon alkoxide is in the range of around 1.5 to 1 and up to around 4 to 1. This hydrolyzate, through the hydrolysis and polymerization reactions, has ungelled polymer species resulting in a spinnable viscosity of around 50 to greater than 1,000 poise but short of complete gelation through three-dimensional crosslinking. The fibers coming from the spinnerette can be contacted with the liquid nonsolvent by two alternative approaches. One is having the spinnerette located in the nonsolvent liquid so that the fibers leave the spinnerette directly into the nonsolvent liquid. The other is to have the spinnerette outside the nonsolvent liquid so that the fibers in a continuous length come from the spinnerette into a gaseous environment and proceed to the nonsolvent liquid. In both contacting approaches the nonsolvent liquid provides for the effective coagulation of the fiber to produce cohesive and preferably substantially nonsticky fiber in continuous lengths from the spinnerette.

Generally, the fiber or fibers are removed from the nonsolvent liquid for collection as sol gel precursor fibers or for treatment in a second liquid or for heating to produce porous siliceous-containing fibers or heated to consolidate the fiber to a silica glassy fiber or any combination of these approaches. Collection of the fiber by winding occurs when the fiber is substantially nonsticky. Achieving this nonstickiness is through contacting in the nonsolvent liquid or by drying the sticky fiber removed from the nonsolvent liquid prior to winding. When the siliceous-containing fiber is treated with a second liquid, this treatment can be for washing and/or stretching and/or strengthening of the fiber or fibers. If only washing occurs in the treatment with the second liquid, the fibers so treated can be subsequently treated for strengthening.

DETAILED DESCRIPTION OF THE INVENTION

The sol-gel route requiring no melting of any fiber forming materials produces inorganic oxide fibers with continuous lengths by dry jet wet or wet spinning by first producing a precursor fiber. It is believed without limiting the invention that such fiber contains siloxane linkages along with materials such as water, solvent and perhaps alkoxides. By the terms "continuous length" for the fibers, it is meant that the fibers are produced from the process in a definite quantity of fiber in a continuous length for that quantity. Also, the fiber is processed in a continuous length from formation at the spinnerette to removal from the nonsolvent liquid. To prepare the inorganic oxide porous fiber, the organic materials are removed from the precursor fiber by heating. The preparation of an essentially nonporous inorganic oxide fiber involves consolidation or calcination by heating the precursor fiber or the porous fiber produced to temperatures higher than 500° C. up to around 1100° C.

In preparing the fibers a sol or hydrolyzate is prepared of silicon alkoxides or hydrolyzed siliceous compounds. The silicon alkoxide has the general formula $Si(OR)_4$ and nonexclusive examples include silicon methoxide, silicon ethoxide, silicon propoxide and the like materials well known to those skilled in the art. Alternatively, these materials are referred to as alkyl silicates including methyl silicate, ethyl silicate and propyl silicate. Accompanying the silicon alkoxide or alternatively thereto, colloidal dispersions of hydrous siliceous oxides may be used. For instance, silica, silicic acid and the like well known to those skilled in the art may be used. Also present may be minor amounts of metal alkoxides and/or colloidal dispersions of hydrous oxide of alumina, titania, zirconia and the like well known to those skilled in the art. The type of silica that is useful is ultrafine particle silica such as that commercially available under the names Cab-O-Sil, Aerosil, Arc silica and the like.

Although the hydrolysis of silicon alkoxide can occur through acid hydrolysis or base hydrolysis, for the production of fibers the acid catalyzed hydrolysis is preferred. If it is difficult to dissolve the silicon alkoxide in the water/acid formulation, a suitable solvent can be used. The usual solvents are alcohols such as lower alkyl alcohols like ethyl alcohol and the like known to those skilled in the art. The amount of the solvent is not restricted, but since it must later be removed, it is advantageous to use the minimal effective amount. The ratio of the concentration of the water to the metal alkoxide is generally in the range of around 1.5 to 1 to less than around 4 to 1 to result in a partial hydrolyzate rather than a fully hydrolyzed material. The amount of acid used in the hydrolysis is a catalytic amount, and the type of acid can be any inorganic or organic acid, nonexclusive examples of which include hydrochloric acid, acetic acid and oxalic acid. Generally, the reactants and their amounts useful in producing the sol or hydrolyzate used in the dry spinning of fibers, which is known by those skilled in the art, can also be used in preparing the sol for the wet spinning or dry jet wet spinning. Examples of such reactants and their amounts are given in the article entitled "Gel Method for Making Glass", Sumio Sakka, *Treatise on Material Science and Technology*, Volume 22, pages 129–167, Academic Press, Inc., 1982, and the article entitled "The Sol-Gel Transition in Hydrolysis of Metal Alkoxides in Relation to the Formation of Glass Fibers and Films", S. Sakka and K. Kamiya, *Journal of Non-Crystalline Solids*, 48(1982), pages 31–46, North Holland Publishing Co., 1982, both of which are hereby incorporated by reference.

The sol or partial hydrolyzate is produced to result in ungelled polymerization to yield a viscosity for spinning of the fibers that is in the range of around 50 to greater than 1,000 poise but less than that for complete gelation through three-dimensional crosslinking. Preferably the viscosity is around 500 poise or less since initial viscosities higher than 500 poise may limit the spinnability of the fibers. The sol is preferably produced in a manner to limit exposure to atmospheric moisture, although the sol can develop increased viscosity with exposure to the atmosphere if properly controlled. Generally the sol is aged at a temperature ranging from room temperature to elevated temperatures of around 80° to 90° C. Aging at higher temperatures usually requires less time of aging where the time ranges from around 10 to 100 hours. It is also preferred to conduct the initial acid hydrolysis at a temperature ranging from ambient to an elevated temperature of around up to less than 100° C., for instance, up to 90° C. The use of higher temperatures generally involve shorter reaction times, and the reaction times vary from around less than 1 hour up to around 5 to 10 hours.

Upon completion of formation of the sol, the sol passes to a spinnerette having one or more holes for the production of one or more fibers. Any spinnerette known to those skilled in the art of preparing fibers can be used. The passage of the sol is effected by any method known to those skilled in the art to allow for obtaining and moving a spinnable viscosity of around 50 up to greater than 1,000 poise and preferably up to around and including 500 poise in the spinnerette. For example, pressure to move the sol develops from the use of one or more pumps, gaseous pressure, or mechanical charging devices.

The placement of the spinnerette in or external to a liquid treatment bath with the nonsolvent liquid determines whether the process is wet spinning or dry jet wet spinning. In wet spinning the spinnerette is in the liquid bath, whereas in dry jet wet spinning the spinnerette is external to but in proximity to the liquid bath for disposition of the fibers first through air or another gaseous fluid or environment into the nonsolvent liquid bath. The nonsolvent liquid can further the polymerization reaction, gelation, or coagulation, and is generally any liquid, solution or mixture of organic or inorganic compounds that are nonsolvents for the sol. Nonexclusive examples include: an aqueous solution of ammonium hydroxide having a pH in the range of around 8 to 11 and an aqueous solution of organic nitrogen-containing surfactant, or an aqueous solution of a surfactant. The term surfactant has its usual meaning of a surface active agent that is an organic compound that has in the same molecule at least a water soluble moiety and a water-insoluble moiety. Preferably the surfactant is water soluble and has nitrogen-containing moieties. The wet and dry jet wet spinning will be further described with reference to the figures.

Figure 1:
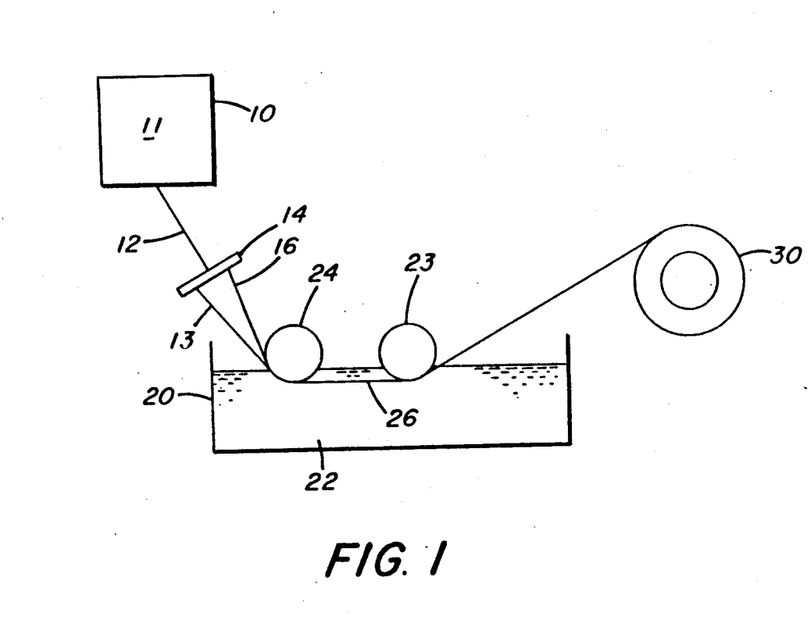
FIG. 1 is a schematic representation of forming the fibers outside of the nonsolvent liquid in a dry jet wet process.

In FIG. 1 the sol 11 is formulated or placed in device 10 for passage or conveyance to the spinnerette 14 through conduit 12. Although the spinnerette could be attached directly to device 10, thereby obviating the presence of conduit 12, FIG. 1 depicts the dry jet wet spinning process where spinnerette 14 is located external but in proximity for disposition of the fibers into the liquid nonsolvent 22 contained in bath 20. The spinnerette may be any spinnerette or any fiber forming device known to those skilled in the art for producing fibers. The device may have circular or noncircular orifices with or without nozzles on the exterior surface surrounding the orifice for spinning filaments or fibers. At least one and preferably a plurality of fibers 13 and 16 are contacted for immersion into the liquid nonsolvent by rollers 24 and 23. The fiber or fibers hereinafter referred to by the term "fibers," which includes both the singular and plural, denoted in FIG. 1 by numeral 26 are preferably kept separated from each other in the nonsolvent liquid. The fibers are removed from the bath by winder 30. Preferably upon removal from the bath, the fibers have surfaces that are substantially nontacky. Such fibers can be combined to form at least one strand, i.e., a plurality of fibers before winding. Through the process from formation of the fibers at the spinnerette 14 to winding at 30 the fibers have a continuous length. To start the fibers from the spinnerette through the bath and onto the winder, a lead is merely pulled through the bath and placed on the winder.

Figure 2:
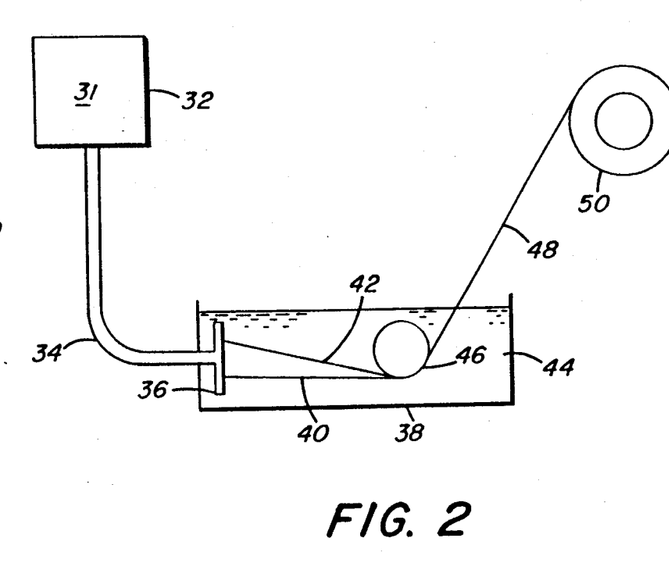
FIG. 2 is a schematic representation of forming the fibers in the nonsolvent liquid in a wet spinning process.

FIG. 2 depicts the wet spinning where the sol 31 is placed in device 32 for passage via conduit 34 to spinnerette 36. The spinnerette is located in the liquid nonsolvent 44 in container or bath 38. One or preferably a plurality of fibers 40 and 42 are contacted by the liquid nonsolvent 44 as they issue from the spinnerette. The fibers are held in the liquid nonsolvent 44 by roller 46. The treated fibers 48 are withdrawn from bath 38 by winder 50. Again, it is preferred that the fibers are kept separated in the nonsolvent liquid.

As shown in FIGS. 1 and 2, the fibers produced by the dry jet wet spinning or the wet spinning process contact the liquid nonsolvent. The type of liquid nonsolvent and duration of contacting and the temperature of the liquid nonsolvent during contacting provides for furtherance of gelation or coagulation to produce cohesive fibers and preferably fibers that have at least surfaces that are essentially nonsticky. The development of effective coagulation may occur by one or more routes including additional polymerization, additional hydrolyzation and polymerization and/or removal of organic solvent. The viscosity of the spinning fluid, along with effective coagulation maintains the integrity of the fibers. The integrity of the fibers refers to a minimum amount of spreading of the liquid fiber in the nonsolvent bath. An aqueous alkaline solution for the nonsolvent liquid is preferably a diluted ammonium hydroxide solution with a pH from 9 to 10, but can be an aqueous alkaline solution of other types of water soluble inorganic or organic bases producing an equivalent pH. The nitrogen-containing surfactants useful in an aqueous solution include: long carbon chain alkyl amines, alkyl amides, polyalkyleneimides, amidated polyamines, polyamino amides, oxylated amines, alkyltrialkyl quaternary ammonium salts, alkyl imidazoline derivatives, fatty amides including primary and/or secondary, amides ethylene bisamides and alkanol-amides all having alkyl moieties having from 5 to 30 carbon atoms. In addition, other types of nitrogen-containing surfactants can be used such as partially amidated polyalkylenimines such as those shown in U.S. Pat. No. 3,597,265 hereby incorporated by reference. A particularly useful nitrogen-containing surfactant is pelargonic tetraalkylene pentamine derivatives, some of which may have a formula like:

Such a material is commercially available as Emery 6760U which is a 50 percent active version of an internal/external lubricant in a mixture of acetic acid and water. This liquid has a viscosity in centistokes at 100° F. of 1200, a density in pounds per gallon of 9.2 and a Gardner color of 8. Another suitable surfactant is that available from Emery under the trade designation Emery 6717 which is a viscous liquid having a pour point of 55 at 25° C., having a density in pounds per gallon of 8.3, a Gardner color of 10, a cloud point of less than 25° C., a flash point of 540° F. and being soluble in water, dispersible in mineral oil, and insoluble in organic solvents such as butyl stearate, glycerol trioleate, stoddard solvent and xylene. The concentration of the nitrogen-containing surfactant in the nonsolvent liquid ranges from about 0.05 to around 2 weight percent of the liquid nonsolvent. The temperature of the nonsolvent liquid generally ranges from above freezing to less than the boiling point and more particularly ranges from room or ambient temperature to around 80° C. The residence time of the fibers in the liquid nonsolvent is an effective time to allow for development of cohesive fibers and preferably predominantly nonsticky fibers. In addition, organic solvents can be used as a liquid nonsolvent, but it is preferred to use an aqueous solution to allow for additional hydrolysis of the silicon alkoxides in the fibers. Generally, the residence time of the fibers in the liquid nonsolvent range is from around 0.01 to 1 minute since the fibers can be pulled through the liquid nonsolvent at speeds up to around 80 feet or more, even up to around 150 feet per minute.

Figure 3:
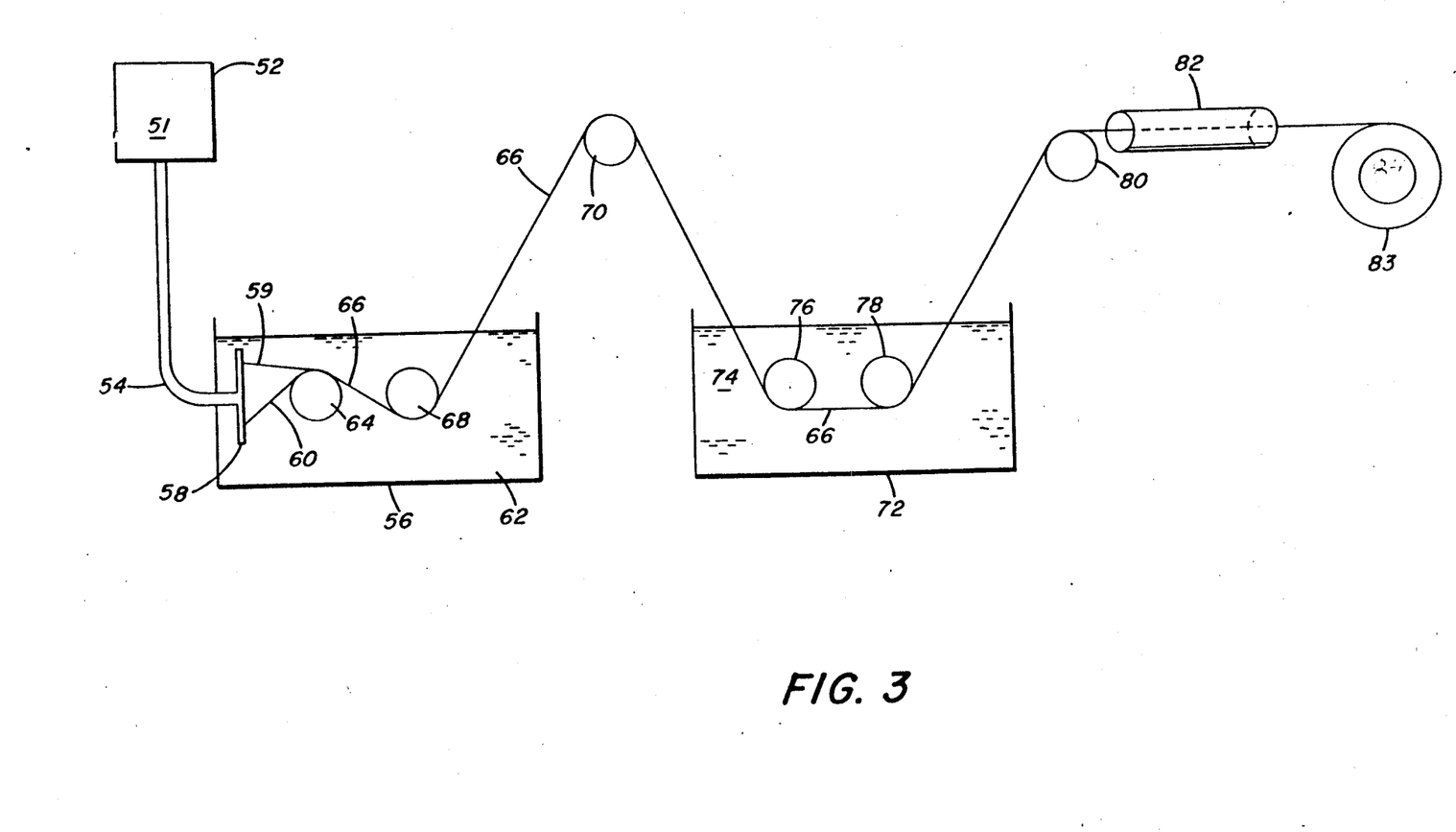
FIG. 3 is a schematic representation of the wet spinning process where a treatment with a second liquid occurs with subsequent drying and winding of the fibers.

The arrangement of rollers or devices to maintain the fiber in contact with the nonsolvent liquid can be any arrangement to accomplish this purpose. Variations of roller arrangements are shown in FIGS. 1, 2 and 3. FIG. 3 depicts fibers produced by the wet spinning process similar to FIG. 2 with a different arrangement of rollers to allow for a different path of the fiber through bath 56.

In FIG. 3 as in FIG. 2 the sol 51 is in device 52 through placement in or direct formulation within the device and is passed through conduit 54 to spinnerette 58. The fibers 59 and 60 travel over roller 64 and under roller 68 in the liquid nonsolvent 62 in bath container 56. The fibers are withdrawn from bath 56 as precursor fibers 66 by roller 70. In FIG. 3 roller 70 can be a godet to provide for a second liquid treatment of the fibers. The fibers subjected to the treatment of the second liquid can also come from the dry jet wet spinning process of FIG. 1. Preferably both the dry jet wet spinning and wet spinning utilize the treatment with the secondary liquid. The fibers are contacted with the second liquid 74 in container 72 through submersion under one or more rollers 76 and 78, although any arrangement of rollers for maintaining contact can be used. The second liquid is any liquid that can wash or assist in stretching or strengthening of the fibers.

It is preferred in dry jet wet spinning to have the liquid nonsolvent as the nitrogen-containing surfactant 6760U present in an amount of around 0.4 to 0.5 weight percent in an aqueous solution which has a pH in the range of around 9 to 10, and preferably the liquid nonsolvent is at an elevated temperature in the range of around 20° to 70° C. With this type and these conditions of the liquid nonsolvent, the fiber withdrawn from the liquid nonsolvent bath has a sufficient degree of coagulation to be wound on the winder.

Generally, the second liquid can be any inorganic or organic nonsolvent capable of washing the fibers, and the second liquid is at a temperature in the range of around room temperature to less than the boiling point of the liquid. Preferably, the second liquid is water at an elevated temperature of less than 75° C. Additionally the second liquid can be a mixture of water and a solvent for the sol that is miscible in water such as ethanol. Most preferred, the second liquid is a diluted aqueous solution of an acid or basic catalyst to strengthen the fibers. Nonexclusive examples of such catalysts include sodium hydroxide, ammonium hydroxide, ammonia, hydrochloric acid, oxalic acid and acetic acid. A dilute solution is that which is generally less than around 5 normal. For stretching of the fiber into finer diameters the fiber entering the bath with the second liquid should not be overly crosslinked. The fibers 66 are withdrawn from the bath 72 by roller 80 or for stretching by godet 80. Godets 70 and 80 and rollers 76 and 78 in bath 72 are operated at differential speeds to allow for stretching of the fibers entering bath 72.

The thread advancing rolls or godets 70 and 80 produce the requisite tension to stretch the fibers in the second liquid bath 72. Alternatively or accompanying the stretching of the fiber in the second liquid bath the second liquid 74 may have a dilute solution of acidic or basic catalyst to assist in strengthening the fibers. The residence time of the fibers in the second liquid bath can range from around 0.01 to 1 minute or more and the fibers can have speeds through the bath in the range of around 10 to around 600 feet per minute. The fibers 66 are removed from the second liquid bath by the strand advancing roller or godet 80 and are wound into package 83 on winder 84. If the fibers are not sufficiently dried to avoid sticking, the fibers can pass through a tube heater 82 before being wound into package 83. A suitable temperature of the tube heater for this purpose would range between around 100° to around 200° C. A similar tube oven to 82 could be used in FIGS. 1 or 2 for drying any sticky fibers removed from the nonsolvent liquid. In such a process the tube oven would be located after the nonsolvent liquid treatment and before winding. Also, in the processes of FIGS. 1, 2 or 3 the tube heater could have a temperature sufficient to remove water and solvent and any organic material by its temperature up to around 450° to 500° C. to produce the porous siliceous-containing fiber. In the alternative, the fibers in package 83 can be further treated in a oven or tube oven or any other heating device known to those skilled in the art to produce the porous, siliceous-containing fibers. Subsequent to this heating step or simultaneously with it, the fibers can be consolidated to produce the siliceous oxide fibers by the temperature of the oven or drying device being in the range of around 500° C. to 1100° C. Also, in the alternative when the second liquid 74 is used for washing the fibers, the fibers may be subsequently treated in a dilute acid or basic solution to strengthen the fibers. This subsequent treatment could occur before or after winding the strands into a package 83. Occurrence before winding would be accomplished in a process step as a third treatment bath with similar features to that of the second treatment bath of FIG. 3.

The fibers produced as precursor fibers can subsequently be heat treated to produce the porous siliceous-containing fibers or the consolidated fibers. The porous siliceous-containing fibers are useful as porous inorganic membranes and substrates for catalyst deposition. The consolidated fibers are useful as glass fibers produced from melting glass forming batch material.

PREFERRED EMBODIMENT

The best mode of the invention for the production of the sol gel siliceous-containing fibers is through wet coagulation in either the wet spinning or dry-jet wet spinning process. Silicon ethoxide is dissolved in a minimal amount of ethyl alcohol so that the volume ratio of ethyl alcohol to tetraethyl orthosilicate is in the range of around 0.3 to 0.8. Water is combined with the tetraethyl orthosilicate in an amount to give a molar ratio of concentrations of water to tetraethyl orthosilicate in the range of around 1.5 to 1.8. The reaction is conducted at a temperature in the range of around room temperature to around 90° C. for a period of time between less than one hour to around 20 hours. Use of higher temperatures allows use of lower reaction times and use of lower temperatures allows for use of longer reaction times, although the reaction can be conducted at room temperature in the initial stages. The effective catalytic amount of the acid, which is preferably hydrochloric acid, is in the range of around 0.01 to about 0.05 moles per mole of tetraethyl orthosilicate.

After the reaction is conducted for the specified period of time, the sol is aged at a temperature in the range of around room temperature to around 90° C. for around 1 to around 100 hours. The spinnable viscosity developed is in the range of around 80 to 500 poise.

The aged sol is processed in accordance with the process depicted in FIG. 3 from a multifilament spinnerette. The nonsolvent liquid in the bath is an aqueous solution of the acidified amidated polyamine Emery 6760U in an amount in the range of around 0.2 to 0.5 weight percent. Also, the nonsolvent liquid has a pH adjusted in the range of around 9 to 10 and is also at a temperature in the range of 10° to 60° C. The speed of traverse of the fibers through the nonsolvent liquid is in the range of around 10 to around 150 feet per minute. The fibers are removed from the nonsolvent liquid and preferably sprayed with water to assist in washing the fibers before they are treated with the second liquid.

The second liquid is at an elevated temperature in the range of around 60° to 65° C. to assist in stretching of the fibers. The second liquid is an aqueous solution of ammonium hydroxide where the ammonium hydroxide is present in an amount up to around 0.5 weight percent. If stretching is imparted to the fiber in the second liquid, the second liquid will contain little or no ammonium hydroxide. The fibers are traversed through the second liquid at a speed in the range of around 10 to around 600 feet per minute. For stretching the speed through the second bath is faster than the speed through the nonsolvent liquid or the removal speed from the second bath is faster than the entry speed of the second treatment bath. The fibers are removed from the second liquid treatment and passed through a tube dryer to assist in drying the fibers, and the fibers are wrapped in a package of superimposed annular layers of continuous fiber on a winder.

In the aforementioned disclosure for the preferred embodiment, all of the stated ranges are generally specified since they cannot be specified with particularity to cover all of the individual sol compositions and processing steps contemplated by the present invention because of the variation in the molecular weight of the sols and the difference between wet processing and dry jet wet processing. The specific variables may individually effect the specific value within the stated ranges. For the values within the stated ranges there are many sol compositions and processing steps that will result in fiber formation.

The invention will be further illustrated by referring to the following nonlimiting examples.

EXAMPLE I

A sol was prepared by combining tetraethyl orthosilicate and water and hydrochloric acid in sufficient amounts to give a molar ratio of the concentration of water to the concentration of tetraethyl orthosilicate (TEOS) of 1.5 and a ratio of the concentration of hydrochloric acid to TEOS of 0.021 and a volume ratio of ethyl alcohol to TEOS of 0.5. The reaction solution was aged in a humid atmosphere at 70° C. to give a solution with a viscosity of 80 poise. This solution was further aged in an oven at 70° C. for 2 hours in a tightly covered container and at room temperature until used to produce fibers. The viscosity of the spinning solution at room temperature increased to 260 poise. About 50 milliliters of the viscous solution was transferred into an L-shaped wet spinning unit and extruded through a hole in the syringe housing attached to the unit. The extrusion was effected by the application of nitrogen pressure. With about 10 psi pressure of nitrogen gas, continuous fibers were formed. The spinning unit was set near the nonsolvent liquid in a coagulation bath to keep it about 4 inches above the bath liquid surface. The fiber was allowed to collect on the surface of the liquid where it was guided along the bath through the liquid and under the guide onto the godet. The nonsolvent liquid in the bath was dilute ammonium hydroxide prepared by dissolving 32 milliliters in 8 liters of distilled water to obtain a pH in the range of 9 to 10. The solution was at an elevated temperature of 50° C. when the fiber was drawn. With about 10 psi pressure of nitrogen gas the continuous fiber was formed at a rate of 70 feet per minute for 1 hour. The fiber was sticky, and after complete drying, the fiber was opaque and brittle.

EXAMPLE II

Six hundred milliliters of TEOS were combined with 300 milliliters of ethyl alcohol and were stirred for 45 minutes, and a mixture of 56.5 milliliters of one molar HCl and 16.1 milliliters of water was added dropwise in 40 minutes. The reaction was conducted at 80° C. for 2 additional hours, and the solution was transferred into a beaker, and the beaker was maintained at 70° C. in an oven through which moist air was passed. After about 80 hours the solution viscosity increased to 24 poise. The viscosity did not increase further on maintaining the solution at a temperature of 70° to 75° C. for 12 more hours. The solution was stored in a closed bottle at room temperature and even after about 7 weeks, the viscosity remained at 24 poise. The solution was transferred to a 500 milliliter flask and heated to 65° C. under vacuum to strip off ethanol. Even after 30 minutes of heating, no ethanol was distilled, and the viscosity of the solution remained at 24 poise. To about 1 milliliter of the solution there was mixed a few drops of chlorotrimethoxysilane, and the solution was left at room temperature in a small open beaker. Even after 20 days the solution did not solidify nor did the viscosity seem to increase. About 40 milliliters of this solution (24 poise viscosity) was placed in a 200 ml bottle and placed in an oven at 55° C. Also, one liter of water in a 1000 ml beaker was placed in the oven at 55° C. to obtain almost 100 percent relative humidity in the oven. After 2½ days under these conditions, the viscosity of the solution increased to greater than 1000 poise. A small amount of this solution was kept in an open bottle, but it did not dry. Five ml of ethylalcohol were added to approximately 30 ml of this solution to reduce the viscosity to 21 poise. This solution was divided into two parts. The first part of the solution was heated under vacuum, and the viscosity did not change from 24 poise. The second solution was aged at 55° C. and almost 100% relative humidity air, and the viscosity of the solution increased to greater than 1000 poise, and the solution did not dry or gel. Five ml of ethylalcohol were added to about 30 ml of this highly viscous solution. This decreased the viscosity to 21 poise. The diluted solution was stored in a closed bottle at room temperature, and after one month the viscosity increased to 64 poise. The second solution having a viscosity of 64 poise was injected into a long column of dilute ammonium hydroxide (2 ml per 100 ml of water) having a temperature of 45° to 50° C. and long fiber was obtained. The fiber collected on a spiral turning at the bottom of the column. The fiber was immediately withdrawn from the bath, and the fiber, which was collected at the bottom of the container, could be uncoiled and pulled out of the bath. This indicated that the surface of the fiber gels and dries sufficiently to make the fiber nonsticky. However, the fiber was somewhat brittle.

The remaining portion of the second solution having a viscosity of 64 poise was aged in an oven for 2 hours at 70° to 74° C., and the viscosity was found to increase to 91 poise. After two more hours of aging and leaving the solution open at room temperature, the viscosity was found to have increased to 450 poise. This solution was passed to a spinnerette and a fiber was drawn directly into dilute sodium hydroxide at 50° C. with the same apparatus as Example I. As much as 200 ml of concentrated ammonia solution were added to about 5 liters of water to improve the gel, and fibers were produced but they were somewhat brittle.

EXAMPLE III

About 10 grams of the amidated polyamine available under the trade designation 6760-U from Emery Chemical Co. were dissolved in about 4 liters of water, and the solution was maintained at 47° C. in a water bath. The sol (spinnable solution) has a room temperature viscosity of 260 poise and it was placed in the L-shaped spinning unit to which was attached a single hole spinnerette. At 25 psi pressure of nitrogen the solution could extrude in the form of a fine filament through the hole in the spinnerette. The spinnerette was kept at about 2 inches high above the nonsolvent liquid bath (dry jet wet spinning) and the extruded fiber was guided through the bath and onto the godet. Fiber was continuously spun and wound on the godet at a rate of 23 feet per minute. The fiber could be unwound and the core and fiber exhibited no stickiness. The fiber was collected in a spinning bath to form a coil at the bottom of the bath from which the fiber could be easily unwound. the fiber was illustrious and transparent. The spinning solution was prepared from water, TEOS, hydrochloric acid, ethylalcohol in amounts to give a ratio of water to TEOS of 1.6, a ratio of hydrochloric acid to TEOS of 0.021 and a ratio of ethyl alcohol to TEOS of 0.5. The reactants were aged for 70 hours at 70° C. The concentration of the Emery 6760-U material in the nonsolvent liquid bath was 0.25 percent.

EXAMPLE IV

A similar sol as used in Example III was produced to have a viscosity of 260 poise. This sol was placed in a small straight tube spinning unit fitted with a spinnerette having 3 holes. The spinnerette was clamped at about 2 inches above the level of nonsolvent liquid in a coagulating bath. The bath liquid was the same as that used in Example III. Under a nitrogen pressure of about 35 psi the solution extruded in the form of fine fibers. Any difficulty in starting the fiber formation was solved by wiping the spinnerette with ethanol. The filaments were extruded into the spinning bath and collected on a rotating godet. The fibers were not sticking to each other and could be separated easily from one another where the spinning was carried out at a speed of 20 feet per minute.

EXAMPLE V

A sol was prepared from water, TEOS, hydrochloric acid and ethylalcohol in amounts to give ratios of concentrations of 1.6 for water to TEOS, 0.021 for HCl to TEOS. The volume ratio for ethylalcohol to TEOS was 0.5. The reaction was conducted in a 1 liter flask and the TEOS and ethylalcohol were heated to about 50° C. and the water and hydrochloric acid were added dropwise whereupon the solution boiled. The preparation was completed in 30 minutes and the flask was placed in the oven at a temperature of 65° to 70° C. After 2 hours the solution was poured into a wide crystallization dish and placed in the oven having a humid atmosphere. After about 22 hours of aging at around 70° C. the solution was fairly viscous, and it was transferred to another bottle and aged in an oven having a humid atmosphere for around 4 more hours to give a total of 25 hours. On standing overnight at room temperature the viscosity increased to 385 poise. The total aging time was 31 hours. The sol was placed in a pressurized container attached to a spinnerette having 80 holes with a diameter of 0.15 mm per hole. With an applied nitrogen pressure of 25 psi the sol was extruded directly into a nonsolvent liquid. The nonsolvent liquid was prepared by placing approximately 25 grams of the Emery 6760-U material in 8 liters of water which was at room temperature of around 21° C. The multifilament yarn was guided through the nonsolvent liquid bath and out of the bath onto a first godet which was rotating at approximately 5 feet per minute. At this first godet the fibers were sprayed with water. From this first godet the fibers were guided through a second liquid bath of hot distilled water maintained at a temperature of around 65° to 68° C. The fibers were pulled through the second liquid bath at a speed of 25 to 30 feet per minute to stretch or draw the fibers. The fibers could be drawn to 5 or 6 times their original length. The wet fibers were wound onto bobbins and the fibers were flexible and not brittle. Upon drying at room temperature the fibers became opaque and somewhat brittle. Some of the fibers were subsequently treated in a dilute acid solution of 0.1 normal HCl.

The fibers retained their shape and the fibers had somewhat improved strength. Additional fibers were treated in a dilute solution of ammonium hydroxide while others were treated in a dilute solution of sodium hydroxide. The first basic solution was 1 ml of ammonium hydroxide per 50 ml of water, and the second basic solution was 0.2 grams of sodium hydroxide per 100 ml of water. The fibers were soaked in the acid or basic solutions overnight at room temperature and the fibers became resistant to ethyl alcohol and acetone.

Fibers were also spun in a similar manner into a nonsolvent liquid coagulating bath which was a more concentrated coagulating bath having Emery 6760-U in a concentration of 0.43 percent. The fibers prepared according to Example V utilizing the more concentrated coagulating solution appeared to have better strength and were not as brittle, and the yarn was resistant to ethylalcohol and acetone even before a hydrochloric acid or ammonium hydroxide treatment.

EXAMPLE VI

A sol was prepared combining 425 ml of TEOS with 210 ml of ethyl alcohol which was stirred at room temperature for 5 minutes. Afterwards, an addition of 40 ml of one mole or HCl and 14.9 ml of water in approximately 10 minutes was made. The solution was placed in an oven with a humid atmosphere in a 2 liter beaker at a temperature of 65 ° to 70° C. for around 80 hours at which time the viscosity of the solution was 385 poise. This solution was passed with nitrogen pressure in a tube with a spinnerette attached to its end. The spinnerette had 80 orifices. Fibers were spun in a manner similar to that of Example V and the fibers from the coagulation bath were passed to a bath of a second liquid for drawing. The drawing bath was filled with 0.05 percent sodium hydroxide solution and maintained at a temperature of 60° to 65° C. The filaments could be drawn by 1.6 to 2 times their original length. The fibers were removed from the drawing bath and guided through a hot tube having a length of 1 foot which was kept at a temperature of 100° to 130° C. After leaving the hot tube the fibers were wound. The fibers were still somewhat brittle but lustrious.

EXAMPLE VII

A sol was prepared from a 500 ml of TEOS and 250 ml of ethyl alcohol placed in a crystallization dish which had added to it 47.1 ml of one molar hydrochloric acid with 17.5 ml of water. This addition was completed in about 10 minutes and the crystallization dish was covered and placed in an oven having a temperature of 65° to 70° C. The dish was maintained in the oven in that condition for 1 hour, after which the cover was removed to expose the sol to the humid atmosphere of the oven. After about 26 hours of aging the surface of the sol appeared to have dried, and a film was formed.

The sol was transferred to an 8 ounce bottle and placed in the oven for 2½ hours more. The viscosity of the solution increased to greater than 1000 poise, but the solution was still homogeneous. An amount of 15 ml of ethyl alcohol was added and the flask was mixed well with a spindle and the viscosity decreased to 190 poise. The solution was again placed in the oven for 1½ hours and cooled to room temperature at which time the viscosity was approximately 390 poise and the solution was stored in the freezer. The solution was removed from the freezer after being there overnight and was used to wet spin fibers where the viscosity of the solution was about 400 poise at the time it was transferred to the spinning unit. The spinning was carried out similar to that of Examples V and VI where the initial speed through the coagulation bath was 5 feet per minute. The fibers in the drawing bath (second treatment bath), which was hot distilled water at a temperature of 60° C. without the presence of any catalyst, could not be drawn by more than two times. The fibers obtained from the drawing bath after heating in the tube heater were lustrious.

We claim:

1. The process for producing at least one amorphous siliceous-containing fiber, comprising:
   a. forming at least a partial hydrolyzate of at least one metallic type compound selected from the group consisting of: silicon alkoxide, and colloidal dispersions of hydrous siliceous oxides and mixtures thereof with and without metal type compounds selected from the group consisting of metal alkoxides and colloidal dispersions of hydrous oxides of alumina, titania, and zirconia by acid catalyzed hydrolysis in the presence of an organic solvent at a temperature in the range of around ambient to elevated temperatures less than 100° C. and with a ratio of water to silicon alkoxide in the range of around 1.5 to 1 up to less than 4 to 1, so that ungelled polymerization results in a spinnable viscosity in the range of around 50 to greater than 1000 poise,
   b. passing the at least partial hydrolyzate through a spinnerette having at least one orifice to produce at least one fiber having a continuous length from the spinnerette,
   c. contacting the at least one fiber from the spinnerette with a nonsolvent liquid at a temperature and for a time for effective coagulation to produce cohesive fiber with a continuous length from the spinnerette, and
   d. removing the fiber as a continuous length from the nonsolvent liquid, where the fiber is a continuous length from the spinnerette through contact with the liquid nonsolvent and to removal.

2. Process of claim 1, wherein the contacting with the nonsolvent liquid is performed directly upon issuance of the fiber from the spinnerette.

3. Process of claim 1, wherein the at least partial hydrolyzate has ungelled polymerization to give a viscosity of at least 200 poise and the contacting of the fiber with the nonsolvent liquid is accomplished after the fiber is removed from the spinnerette which is remote from the nonsolvent liquid, and the fiber is subsequently immersed in the nonsolvent liquid.

4. Process of claim 3, wherein the nonsolvent liquid is comprised of an aqueous solution of a nitrogen-containing surfactant with an effective amount of base to provide a pH in the range of around 8 to 11 and where the nonsolvent liquid is at a temperature in the range of around 25° to 80° C.

5. Process of claim 1, wherein the nonsolvent liquid is water with a sufficient amount of an water soluble inorganic or organic base to have a pH in the range of around 8 to around 11.

6. Process of claim 1, wherein the nonsolvent liquid is an aqueous solution having at least one material selected from the group consisting of a surfactant and nitrogen-containing surfactant.

7. Process of claim 6, wherein the nitrogen-containing surfactant is selected from the group consisting of long chain alkyl amines, long chain alkyl amides, amidated alkyl amines, polyamino alkyl amides, partially amidated polyalkylene amides and partially amidated polyalkylene imines.

8. Process of claim 1, wherein the nonsolvent is an aqueous solution having a surfactant to effectively coagulate at least the surface of the fiber to produce a predominantly nonsticky fiber and which includes winding the fiber upon removal from the nonsolvent liquid into superimposed annular layers of continuous fiber on the winder.

9. Process of claim 1, wherein the continuous length of fiber removed from the nonsolvent liquid is a sticky fiber that is dried in a continuous length to a nonsticking state before collecting the fiber on a winder.

10. Process of claim 1, wherein the at least partial hydrolyzate has in addition to the silicon alkoxide a minor amount of a colloidal dispersion of hydrolyzable oxides of Group IV B metal compounds of the Periodic Table, aluminates, or mixtures thereof.

11. Process of claim 1, which includes heating the fibers to remove any organic constituents and water at temperatures less than around 500° F. to produce the porous siliceous-containing fiber.

12. Process of claim 1, which includes heating the fibers removed from the nonsolvent liquid to produce the amorphous siliceous-containing fiber as consolidated fibers.

13. Process of claim 1, which includes contacting the fibers removed from the nonsolvent coagulation liquid with a second liquid to wash the fibers, and removing the fibers from the second liquid for collection.

14. Process of claim 13, which includes stretching the fibers in the second liquid.

15. Process of claim 13, wherein the second liquid is selected from the group consisting of: water, dilute inorganic acid, dilute organic acid, dilute inorganic base, dilute organic base, or mixture of water and solvent for the sol and where the second liquid is at a temperature in the range from ambient to less than around 75° C.

16. Process of claim 13, wherein the second liquid is water at an elevated temperature and after the fibers are removed from the water, they are treated with a dilute solution of acid or base and collected as siliceous-containing fiber.

17. Process of claim 1, wherein the contacting with the nonsolvent liquid occurs at a residence time of from around 0.01 to 1 minute where the fiber travels through the nonsolvent at speeds up to 150 feet per minute and preferably up to 80 feet per minute.

18. Process for producing at least one amorphous siliceous-containing fiber, comprising:
   a. forming at least partial hydrolyzate of at least one metallic type compound selected from the group consisting of: silicon alkoxides, and colloidal dispersions of hydrous siliceous oxides and mixtures thereof with and without metal type compounds selected from the group consisting of metal alkoxides and colloidal dispersions of hydrous oxides of alumina, titania, and zirconia by acid catalyzed hydrolysis in the presence of an organic solvent at a temperature in the range of around ambient to elevated temperatures less than 100° C. and with the ratio of water to silicon alkoxide of less than around 1.5 to 1 up to around 4 to 1 so that ungelled polymerization results in a spinnable viscosity for the hydrolyzate in the range of around 100 to around 1000 poise, b. passing the at least partial hydrolyzate through a spinnerette having at least one orifice to produce at least one fiber, c. contacting the fibers directly upon the issuance from the spinnerette with the nonsolvent liquid that is at a temperature in the range of about 15° to about 50° C. and that is selected from the group comprising: aqueous basic solution having a pH in the range of about 8 to about 10, nitrogen-containing surfactants, surfactants, and mixtures thereof at a temperature and for a time for effective coagulation to produce at least a sticky fiber, d. passing the fiber from the nonsolvent liquid to a second liquid selected from the group consisting of: 1) water, 2) dilute organic and inorganic acids, and 3) dilute organic and inorganic bases and any mixtures of these, and e. removing the fibers from the second liquid as a continuous length of fiber extending back to the spinnerette.

19. Process of claim 18, wherein the fiber passed to the second liquid is effectively coagulated to be cohesive and to have at least the surface of the fiber in a predominantly nonsticky state.

20. Process of claim 19, wherein the fiber is produced as nonsticky fiber in the nonsolvent liquid.

21. Process of claim 19, wherein the fiber is produced as nonsticky fiber upon removal from the nonsolvent liquid and passage to a drier prior to passing to the second liquid.

22. Process of claim 18, which includes heating the fibers removed from the second liquid to remove any organic constituents and water at temperatures less than around 500° F. to produce the porous siliceous-containing fiber.

23. Process of claim 18, which includes heating the fibers removed from the second liquid to produce the amorphous siliceous-containing fiber as consolidated fibers.

24. Process of claim 18, which includes stretching the fibers in the second liquid that is at an elevated temperature up to about 75° C.

25. Process of claim 18, wherein the second liquid is water and after the fibers are removed from the water they are treated with a dilute solution of acid or base and collected as siliceous-containing fiber.

26. Process of claim 18, wherein the hydrolyzate has in addition to the silicon alkoxide a minor amount of hydrolyzable metal compounds from Group IVB of the Periodic Table, aluminates, silicas, and mixtures thereof.

27. Process of claim 18, wherein the amount of the nitrogen-containing surfactant and the surfactant are in the range of around 0.01 to around 2 weight percent of the aqueous solution for the nonsolvent liquid, and the concentration of any dilute acid or base present as the second liquid is in the range of up to around 1 weight percent of the aqueous solution.

28. Process of claim 18, wherein the organic solvent present in the at least partial hydrolyzate is a lower alkyl alcohol.

29. Process of claim 28, wherein the alcohol solvent is ethanol.

30. Process of claim 18, wherein the contacting with the nonsolvent liquid occurs at a residence time of from around 0.01 to 1 minute where the fiber travels through the nonsolvent at speeds up to 150 feet per minute and preferably up to 80 feet per minute.

31. Process for producing at least one amorphous siliceous-containing fiber, comprising:

a. forming at least a partial hydrolyzate of at least one metallic type compound selected from the group consisting of: silicon alkoxides, and colloidal dispersions of hydrous siliceous oxides and mixtures thereof with and without metal type compounds selected from the group consisting of metal alkoxides and colloidal dispersions of hydrous oxides of alumina, titania, and zirconia by acid catalyzed hydrolysis in the presence of a lower alkyl alcohol solvent at a temperature in the range of around ambient to elevated temperature less than 100° C. and wherein the ratio of water to silicon alkoxide is of less than around 1.5 to 1 up to around 4 to 1 and wherein ungelled polymerization results in a spinnable viscosity for the hydrolyzate in the range of around 200 to around 1000 poise, b. extruding the at least partial hydrolyzate through a spinnerette having at least one orifice to produce at least one fiber issuing from the spinnerette into a gaseous environment, c. contacting at least one fiber with nonsolvent liquid that is at a temperature in the range of about 15° to about 50° C. and that is selected from the group consisting of: aqueous basic solution having a pH in the range of about 8 to about 10, nitrogen-containing surfactants, surfactants, and mixtures thereof for effective coagulation to produce cohesive fiber, d. passing at least one fiber from the nonsolvent liquid to a second liquid selected from the group comprising: 1) water, 2) dilute organic and inorganic acids, and 3) dilute organic and inorganic bases and any mixtures of these, e. removing at least one fiber from the second liquid as a continuous length of fiber extending back to the spinnerette.

32. Process of claim 31, wherein the at least one fiber passed from the nonsolvent liquid has effective coagulation of at least the surface of the fiber to be predominantly nonsticky.

33. Process of claim 31, which includes heating the fiber removed from the second liquid to remove any organic constituents and water at temperatures less than around 500° F. to produce the porous siliceous-containing fiber.

34. Process of claim 31, which includes heating the fiber removed from the second liquid to produce the amorphous siliceous-containing fiber as consolidated fibers.

35. Process of claim 31, which includes stretching the fiber in the second liquid that is at an elevated temperature up to about 75° C.

36. Process of claim 31, wherein the second liquid is water and after the fiber is removed from the water, the fiber is treated with a dilute solution of acid or base and collected as siliceous-containing fiber.

37. Process of claim 31, wherein the hydrolyzate has in addition to the silicon alkoxide a minor amount of hydrolyzable metal compounds from Group IVB of the Periodic Table, aluminates, silicas, and mixtures thereof.

38. Process of claim 31, wherein the amount of the nitrogen-containing surfactant or surfactant are in the range of around 0.01 to around 2 weight percent of the aqueous solution for the nonsolvent liquid, and the concentration of any dilute acid or base present as the second liquid is in the range of up to around 1 weight percent of the aqueous solution.

39. Process of claim 31, wherein the fibers are sprayed with a washing liquid before treatment with the second liquid.

40. Process of claim 31, wherein the contacting with the nonsolvent liquid occurs at a residence time of from around 0.01 to 1 minute where the fiber travels through the nonsolvent at speeds up to 150 feet per minute and preferably up to 80 feet per minute.

* * * * *